US012809832B2

(12) United States Patent
Bansal et al.

(10) Patent No.: US 12,809,832 B2
(45) Date of Patent: Nov. 24, 2026

(54) METHOD AND SYSTEM FOR PROCESSING BATCHES IN A COMPUTING ENVIRONMENT

(71) Applicant: JPMorgan Chase Bank, N.A., New York, NY (US)

(72) Inventors: Shruti Bansal, Mathura (IN); Dipen Shah, Mumbai (IN); Dhruv S Golani, Mumbai (IN); Maithilee Bag, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/091,313

(22) Filed: Mar. 26, 2025

(65) Prior Publication Data

US 2026/0236443 A1 Aug. 13, 2026

(30) Foreign Application Priority Data

Feb. 10, 2025 (IN) ............................. 202511010952

(51) Int. Cl.
*G06F 7/00* (2006.01)
*G06F 16/21* (2019.01)

(52) U.S. Cl.
CPC .................................. *G06F 16/214* (2019.01)

(58) Field of Classification Search
CPC .. G06F 16/214; G06F 16/9577; G06F 16/953; G06F 16/288; G06F 16/2237; G06F 16/285; G06F 16/9538; G06F 16/9038; G06F 16/338; G06F 16/9535; G06F 16/248; G06F 16/243; G06F 16/3347; G06F 16/3344; G06F 16/332; G06F 16/3322; G06F 16/35; G06F 16/2456; G06F 16/2465; G06F 16/2471; G06F 16/24575; G06F 16/24578; G06F 16/2453; G06F 16/2457; G06F 16/24522; G06F 18/23; G06F 18/23211; G06F 18/23213
See application file for complete search history.

(56) References Cited

U.S. PATENT DOCUMENTS

| | | | | |
|---|---|---|---|---|
| 6,725,456 | B1 * | 4/2004 | Bruno | G06F 9/5011 |
| 2013/0007753 | A1 * | 1/2013 | Jain | G06F 9/4881 718/103 |
| 2024/0069961 | A1 * | 2/2024 | Samson | G06F 9/4843 |
| 2025/0123881 | A1 * | 4/2025 | Sankaran | G06F 9/30036 |
| 2025/0272312 | A1 * | 8/2025 | Ganesh | G06F 16/2343 |

* cited by examiner

*Primary Examiner* — Mohammad A Sana
(74) *Attorney, Agent, or Firm* — GREENBLUM & BERNSTEIN, P.L.C.

(57) ABSTRACT

A method and system for processing batches in a computing environment are disclosed. The method includes receiving a plurality of batches from a database. The method also includes aggregating the plurality of batches into a plurality of groups according to a predefined criterion. The method also includes transmitting the plurality of groups to a queue. The method also includes scaling at least one resource to process each group included the plurality of groups, wherein the scaling of the at least one resource is performed based on metadata associated with each batch included in the plurality of batches. The method also includes processing the plurality of groups using the scaled at least one resource to execute the plurality of batches.

18 Claims, 7 Drawing Sheets

METHOD AND SYSTEM FOR PROCESSING BATCHES IN A COMPUTING ENVIRONMENT

CROSS-REFERENCE TO RELATED APPLICATIONS

This application claims priority benefit from Indian Application No. 202511010952, filed on Feb. 10, 2025, in the India Patent Office, which is hereby incorporated by reference in its entirety.

Field of the Disclosure

This technology generally relates to the field of cloud computing, and more particularly relates to a method and a system for providing an optimized architecture for batch processing in a computing environment.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

In recent years, organizations have moved towards cloud computing solutions due to various advantages, such as reduced operational costs, enhanced data accessibility, and improved collaboration. However, the migration of large volumes of data from on-premises systems to cloud environments poses significant challenges. Traditional data migration approaches often involve complex processes that can lead to prolonged downtime, data integrity issues, and increased costs.

The migration of existing applications and their associated batch jobs to a cloud computing environment/platform is a complex and challenging task. The batch jobs used in an application also need to be migrated from an on-premises platform to a cloud computing platform. The batch jobs, which are designed to process large volumes of data in scheduled intervals, are often deeply integrated into the on-premises applications. These jobs may include data extract, transform and load (ETL) processes.

However, existing computing services that enable users to run code without provisioning or managing servers come with strict execution time limits. This constraint poses a significant challenge for organizations with long-running batch jobs that require processing times exceeding such execution time limits. Additionally, the existing computing services require more time for processing batch jobs and are unable to identify failed batch jobs during processing.

Hence, in view of these and other existing limitations, there arises an imperative need to provide an efficient solution to overcome the above-mentioned limitations and to provide a method and system that can offer an optimized solution for processing batch jobs.

SUMMARY

The present disclosure, through one or more of its various aspects, embodiments, and/or specific features or sub-components, provides, inter alia, various systems, servers, devices, methods, media, programs, and platforms for processing batches in a computing environment.

According to an aspect of the present disclosure, a method for processing batches in a computing environment is disclosed. The method is implemented by at least one processor. The method includes receiving, by the at least one processor, a plurality of batches from a database. The method further includes aggregating, by the at least one processor, the plurality of batches into a plurality of groups according to a predefined criterion. The method further includes transmitting, by the at least one processor, the plurality of groups to a queue. The method further includes scaling, by the at least one processor, at least one resource to process each group included in the plurality of groups, wherein the scaling of the at least one resource is performed based on metadata associated with each batch included in the plurality of batches. Thereafter, the method includes processing, by the at least one processor, the plurality of groups using the scaled at least one resource to execute the plurality of batches.

In accordance with an exemplary embodiment, each group included in the plurality of groups may be transmitted with the metadata and a corresponding schedule.

In accordance with an exemplary embodiment, the scaling of the at least one resource may include at least one from among an increase in a number of resources and a decrease in the number of resources.

In accordance with an exemplary embodiment, the method may further include assigning, by the at least one processor, a termination tag to an idle resource out of the scaled at least one resource.

In accordance with an exemplary embodiment, the method may further include terminating, by the at least one processor, an operation of the idle resource based on the assigned termination tag and a predetermined termination criterion.

In accordance with an exemplary embodiment, the method may further include transmitting, by the at least one processor, an alert to a user upon failure of execution of at least one batch included in the plurality of batches.

According to another aspect of the present disclosure, a computing device configured to process batches in a computing environment is disclosed. The computing device includes a processor; a memory storing instructions; and a communication interface coupled to each of the processor and the memory. The processor may be programmed to cooperate with the instructions to perform operations including: receiving a plurality of batches from a database; aggregating the plurality of batches into a plurality of groups according to a predefined criterion; transmitting the plurality of groups to a queue; scaling at least one resource to process each group included in the plurality of groups, wherein the scaling of the at least one resource is performed based on metadata associated with each batch included in the plurality of batches; and processing the plurality of groups using the scaled at least one resource to execute the plurality of batches.

In accordance with an exemplary embodiment, each group included in the plurality of groups may be transmitted with the metadata and a corresponding schedule.

In accordance with an exemplary embodiment, the scaling of the at least one resource may include at least one from among an increase in a number of resources and a decrease in the number of resources.

In accordance with an exemplary embodiment, the processor may be configured to assign a termination tag to an idle resource out of the scaled at least one resource.

In accordance with an exemplary embodiment, the processor may be further configured to terminate an operation of the idle resource based on the assigned termination tag and a predetermined termination criterion.

In accordance with an exemplary embodiment, the processor may be configured to transmit an alert to a user upon failure of execution of at least one batch included in the plurality of batches.

According to yet another aspect of the present disclosure, a non-transitory computer-readable storage medium storing instructions for processing batches in a computing environment is disclosed. The instructions include executable code which, when executed by a processor, may cause the processor to perform operations including: receiving a plurality of batches from a database; aggregating the plurality of batches into a plurality of groups according to a predefined criterion; transmitting the plurality of groups to a queue; scaling at least one resource to process each group included in the plurality of groups, wherein the scaling of the at least one resource is performed based on metadata associated with each batch included in the plurality of batches; and processsing the plurality of groups using the scaled at least one resource to execute the plurality of batches.

In accordance with an exemplary embodiment, each group included in the plurality of groups may be transmitted with the metadata and a corresponding schedule.

In accordance with an exemplary embodiment, the scaling of the at least one resource may include at least one from among an increase in a number of resources and a decrease in the number of resources.

In accordance with an exemplary embodiment, the operations may further include assigning a termination tag to an idle resource out of the scaled at least one resource.

In accordance with an exemplary embodiment, the operations may further include terminating an operation of the idle resource based on the assigned termination tag and a predetermined termination criterion.

In accordance with an exemplary embodiment, the operations may further include transmitting an alert to a user upon failure of execution of at least one batch included in the plurality of batches.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
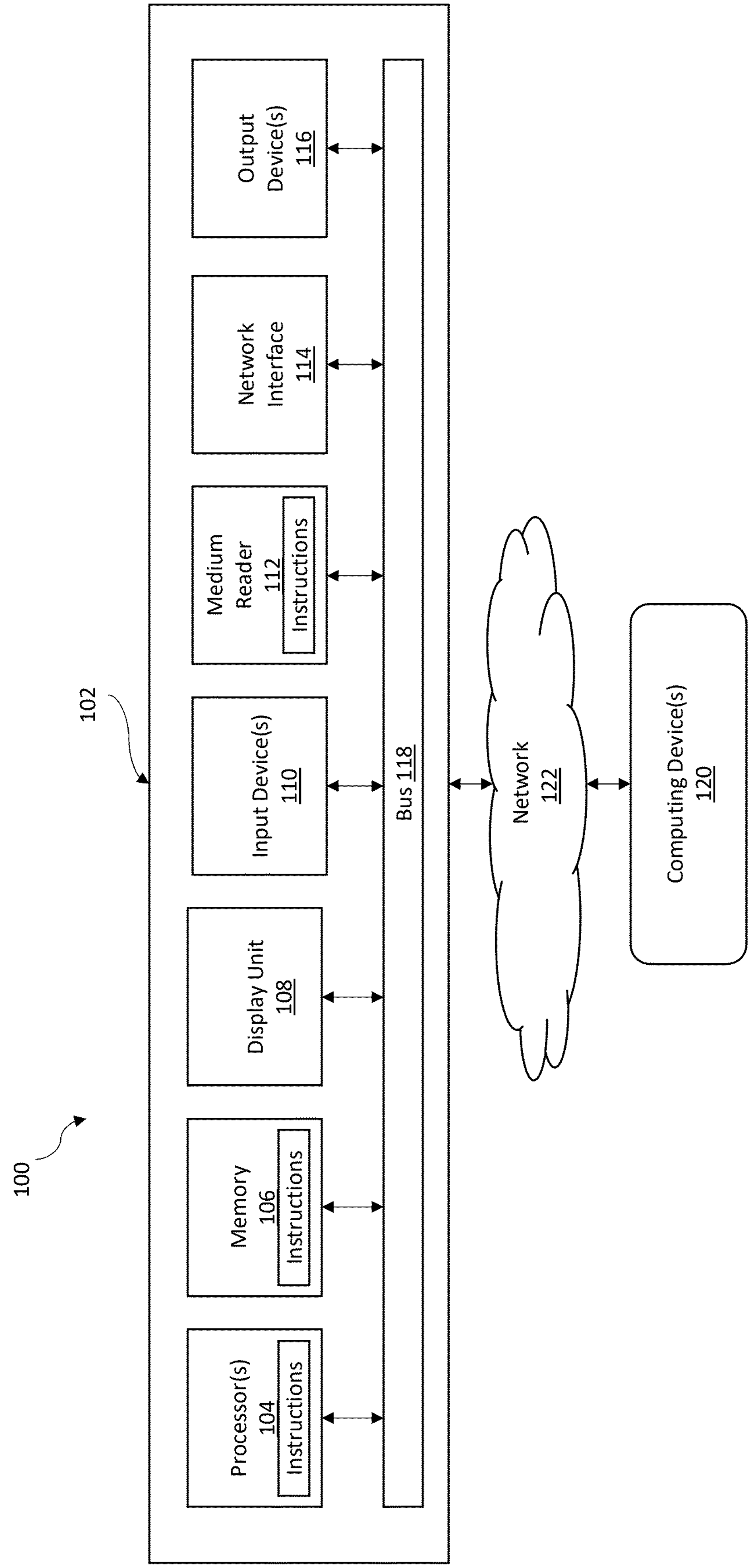
FIG. 1 illustrates an exemplary computer system for processing batches in a computing environment, in accordance with an exemplary embodiment of the present disclosure.

Exemplary embodiments will now be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections and the actual physical connections may be different.

In addition, all logical units and/or controllers described and depicted in the figures include the software and/or hardware components required for the unit to function.

Furthermore, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

As explained above, the existing serverless computing services that enable users to run code without provisioning or managing servers come up with strict execution time limits. This constraint poses a significant challenge for organizations with long-running batch jobs that require processing times exceeding such limits. Additionally, existing computing services require more time for processing batch jobs and are unable to identify failed batch jobs during the processing of a plurality of batches.

To overcome the above-mentioned problems, the present disclosure provides a method and system to process batches in a computing environment. In the present disclosure, the system first receives a plurality of batches from a database. Further, the system aggregates the plurality of batches into a plurality of groups as per a predefined criterion. Next, the system transmits the plurality of groups into a queue. Further, the system scales at least one resource to process each group included in the plurality of groups, wherein scaling of the at least one resource is performed based on a metadata associated with each batch included in the plurality of batches. Further, the system processes the plurality of groups using the scaled at least one resource to execute the plurality of batches. This way the system processes batches in a computing environment.

FIG. 1 is an exemplary system for use in accordance with the embodiments described herein. The system 100 is generally shown and may include a computer system 102 which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environments. Even further, the instructions may be operative in such a cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a display unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art will appreciate that various embodiments of the computer system 102 may include multiple input devices 110. Moreover, those skilled in the art will further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor 104, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may include but is not limited to, a speaker, an audio out, a video out, a remote-controlled output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art will appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computing devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art will appreciate that additional networks 122 which are known and understood may additionally or alternatively be used and that the exemplary networks 122 are not limiting or exhaustive. Also, while the network 122 is shown in FIG. 1 as a wireless network, those skilled in the art will appreciate that the network 122 may also be a wired network.

The additional computing device 120 is shown in FIG. 1 as a personal computer. However, those skilled in the art will appreciate that, in alternative embodiments of the present application, the computing device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Those skilled in the art will appreciate that the above-listed devices are merely exemplary devices and that the computing device 120 may be any additional device or apparatus commonly known and understood in the art without departing from the scope of the present application. For example, the computing device 120 may be the same or similar to the computer system 102. Furthermore, those skilled in the art will similarly understand that the device may be any combination of devices and apparatuses.

Those skilled in the art will appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor 104 described herein may be used to support a virtual processing environment.

As described herein, various embodiments provide methods and systems to process batches in a computing environment.

Figure 2:
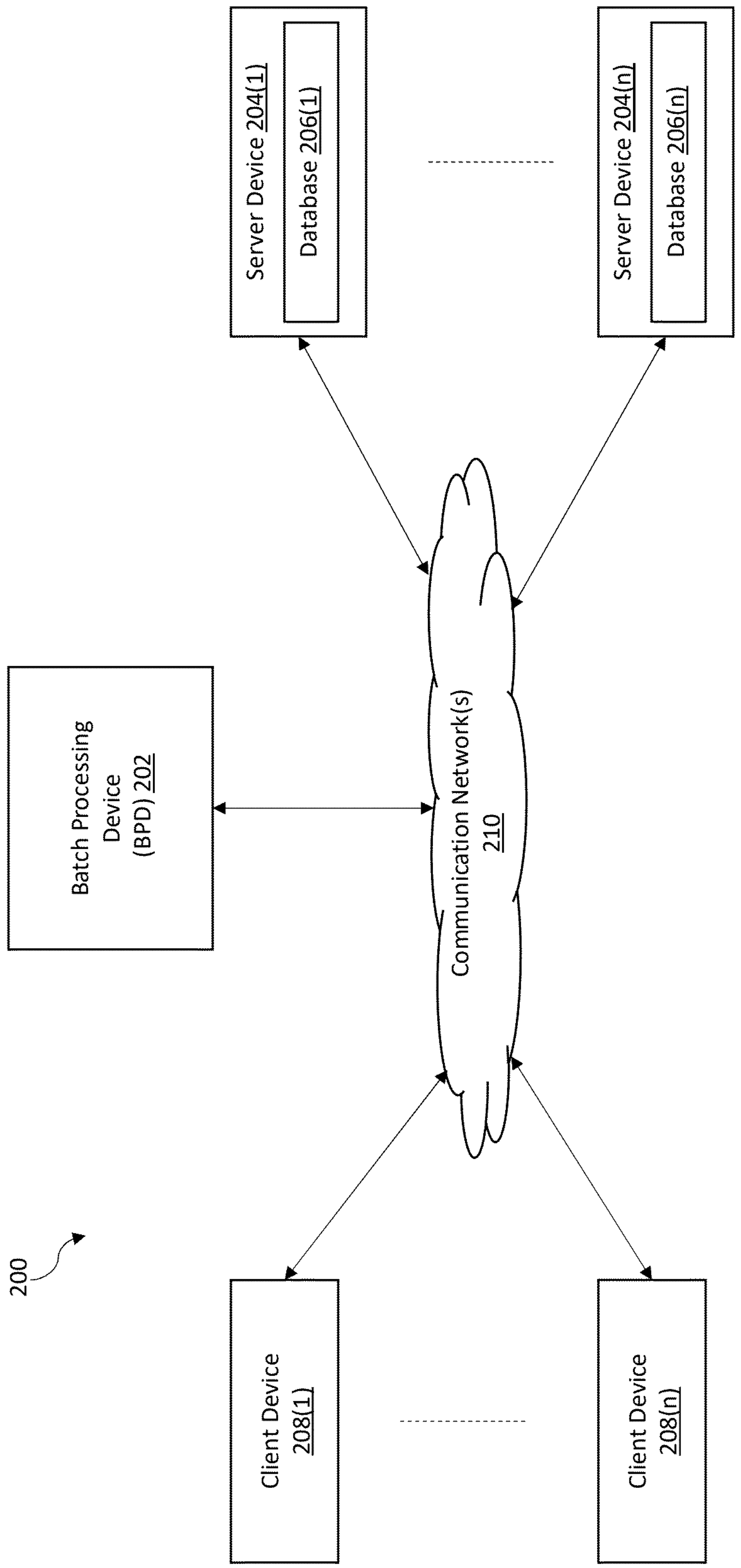
FIG. 2 illustrates an exemplary diagram of a network environment for processing batches in a computing environment, in accordance with an exemplary embodiment of the present disclosure.

Referring to FIG. 2, a schematic of an exemplary network environment 200 to process batches in a computing environment is illustrated. In an exemplary implementation, the method is executable on any networked computer platform, such as, for example, a personal computer (PC).

The method to process batches in a computing environment may be executed by a batch processing device (BPD) 202. The BPD 202 may be the same or similar to the computer system 102 as described with respect to FIG. 1. The BPD 202 may store one or more applications that may include executable instructions that, when executed by the BPD 202, cause the BPD 202 to perform desired actions, such as to transmit, receive, or otherwise process network messages, for example, and to perform other actions described and illustrated below with reference to the figures.

The application(s) may be implemented as modules or components of other applications. Further, the application(s) may be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the BPD 202 itself, may be located in the virtual server(s) running in a cloud-based computing environment rather than being tied to one or more specific physical network computing devices. Also, the application(s) may be running in one or more virtual machines (VMs) executing on the BPD 202. Additionally, in one or more embodiments of this technology, virtual machine(s) running on the BPD 202 may be managed or supervised by a hypervisor.

In the network environment 200 of FIG. 2, the BPD 202 is coupled to a plurality of server devices 204(1)-204(*n*) that host a plurality of databases 206(1)-206(*n*), and also to a plurality of client devices 208(1)-208(*n*) via communication network(s) 210. A communication interface of the BPD 202, such as the network interface 114 of the computer system 102 of FIG. 1, operatively couples and communicates between the BPD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BPD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides several advantages including methods, non-transitory computer-readable media, and BPDs that efficiently implement the method to process batches in a computing environment.

By way of example only, the communication network(s) 210 may include local area network(s) (LAN(s)) or wide area network(s) (WAN(s)), and can use transmission control protocol/internet protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), public switched telephone networks (PSTNs), ethernet-based packet data networks (PDNs), combinations thereof, and the like.

The BPD 202 may be a standalone device or integrated with one or more other devices or apparatuses, such as one or more of the server devices 204(1)-204(*n*), for example. In one particular example, the BPD 202 may include or be hosted by one of the server devices 204(1)-204(*n*), and other arrangements are also possible. Moreover, one or more of the devices of the BPD 202 may be in a same or a different communication network including one or more public, private, or cloud-based networks, for example.

The plurality of server devices 204(1)-204(*n*) may be the same or similar to the computer system 102 or the computing device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the BPD 202 via the communication network(s) 210 according to the hypertext transfer protocol (HTTP)-based and/or javascript object notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) host the databases or repositories 206(1)-206(*n*) that are configured to store a plurality of scheduled batches and alerts generated in case of batch failure, for implementation of the features of the present disclosure.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computing device 120 as described with respect to FIG. 1, including any features or combination of features described with respect thereto. For example, the client devices 208 (1)-208(*n*) in this example may include any type of computing device that can interact with the BPD 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary implementation, at one client device 208 is a wireless mobile communication device, e.g., a smartphone.

The client devices 208(1)-208(*n*) may run interface applications, such as standard web browsers or standalone client applications, which may provide an interface to communicate with the BPD 202 via the communication network(s) 210 in order to communicate user requests and information. The client devices 208(1)-208(*n*) may further include, among other features, a display device, such as a display unit or touchscreen, and/or an input device, such as a keyboard, for example.

Although the exemplary network environment 200 with the BPD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BPD 202, the server devices 204(1)-204(*n*), or the client devices 208(1)-208(*n*), for example, may be configured to operate as virtual instances on the same physical machine. In other words, one or more of the BPD 202, the server devices 204(1)-204(*n*), or the client devices 208(1)-208(*n*) may operate on the same physical device rather than as separate devices communicating through communication network(s) 210. Additionally, there may be more or fewer BPDs 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, may also be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, packet data networks (PDNs), the Internet, intranets, and combinations thereof.

Figure 3:
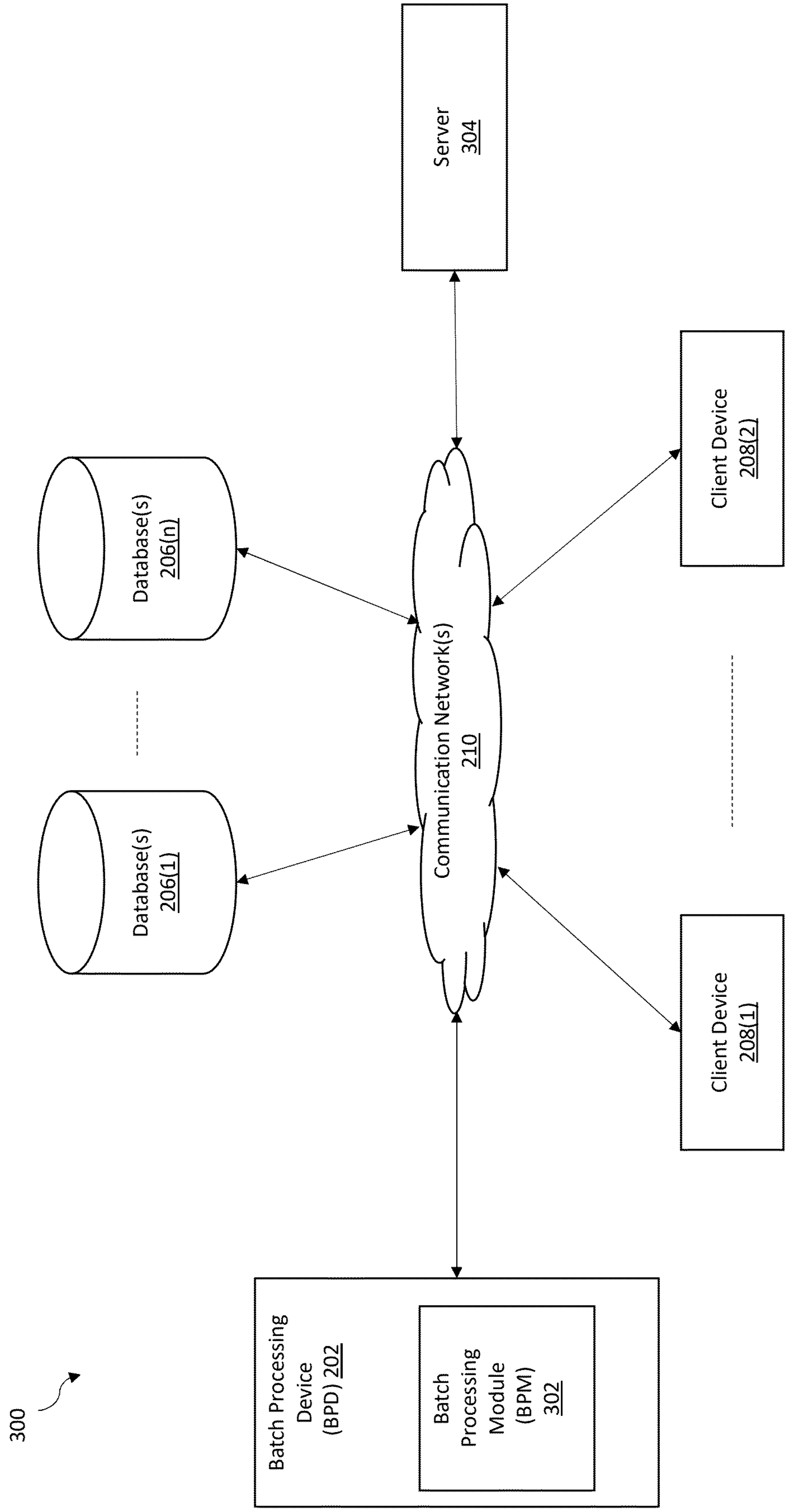
FIG. 3 illustrates a system diagram for processing batches in a computing environment, in accordance with an exemplary embodiment of the present disclosure.

FIG. 3 illustrates a system diagram to process batches in a computing environment, in accordance with an exemplary embodiment.

As illustrated in FIG. 3, the system 300 may include a batch processing device (BPD) 202 within which a batch processing module (BPM) 302 is embedded, a server 304, a database(s) 206(1) . . . 206(*n*), a plurality of client devices 208(1) . . . 208(2), and a communication network(s) 210.

According to exemplary embodiments, the system 300 may comprise the BPD 202 including the BPM 302, which may be connected to the server 304 and the database(s) 206(1) . . . 206(*n*) via the communication network(s) 210, but the disclosure is not limited thereto. The BPD 202 may also be connected to the plurality of client devices 208(1) . . . 208(2) via the communication network(s) 210, but the disclosure is not limited thereto. The database(s) 206(1) . . . 206(*n*) may include a rule database.

In an embodiment, the BPD 202 as described and shown in FIG. 3 includes the BPM 302, although it may include other rules, policies, modules, databases, or applications, for example. As will be described below, the BPM 302 is configured to carry out a method to process batches in a computing environment.

An exemplary system 300 for enabling a mechanism to process batches in a computing environment by utilizing the network environment of FIG. 2 is shown as being executed in FIG. 3. Specifically, a first client device 208(1) and a second client device 208(2) are illustrated as being in communication with BPD 202. In this regard, the first client device 208(1) and the second client device 208(2) may be "clients" of the BPD 202 and are described herein as such. Nevertheless, it is to be known and understood that the first client device 208(1) and/or the second client device 208(2) need not necessarily be "clients" of the BPD 202, or any entity described in association therewith herein. Any additional or alternative relationship may exist between either or both of the first client device 208(1) and the second client device 208(2) and the BPD 202, or no relationship may exist.

Further, the BPD 202 is illustrated as being able to access one or more database(s) 206(1) . . . 206(*n*). The BPM 302 may be configured to access these repositories/databases to provide a method to process batches in a computing environment. In some embodiment, the server 304 may be the same or equivalent to the server device 204 as illustrated in FIG. 2.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the BPD 202 via broadband or cellular communication. These embodiments are merely exemplary and are not limiting or exhaustive.

Figure 4:
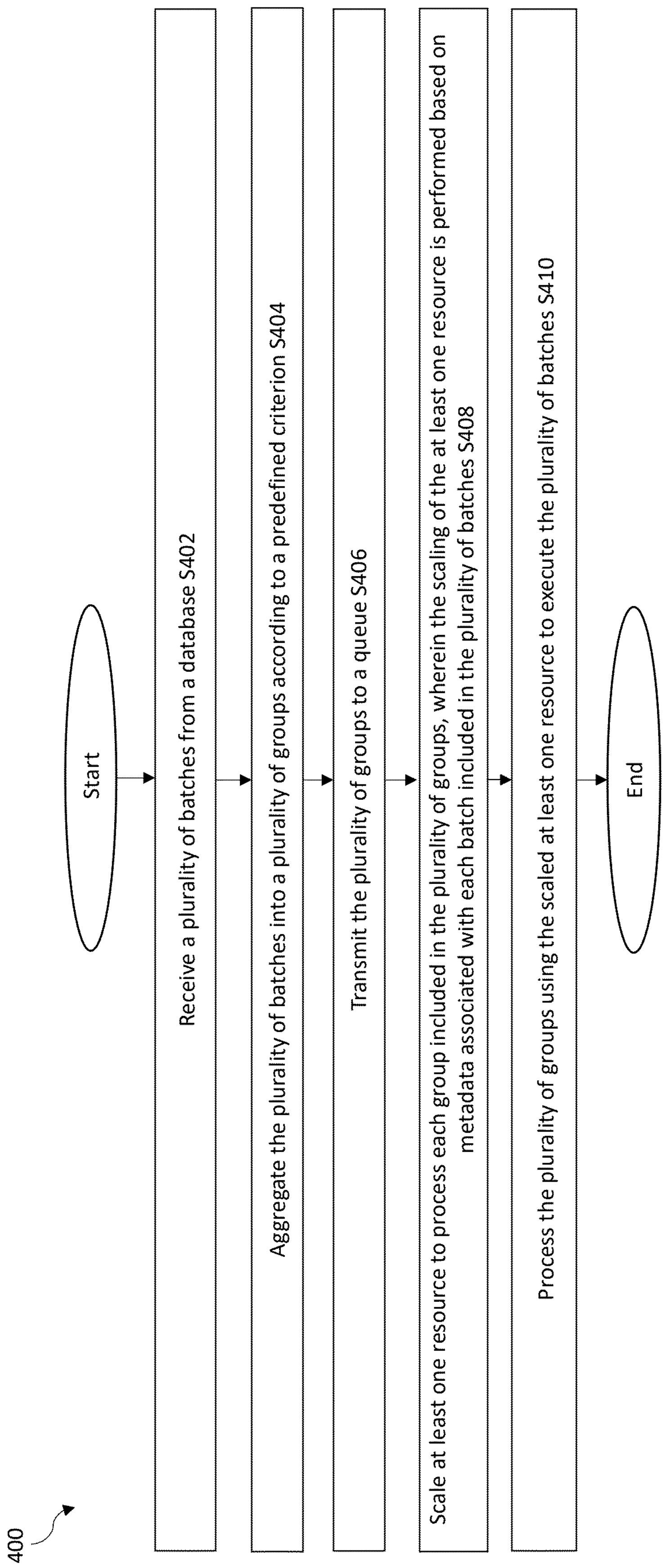
FIG. 4 illustrates an exemplary method flow diagram for processing batches in a computing environment, in accordance with an exemplary embodiment of the present disclosure.

Referring to FIG. 4, an exemplary method 400 is shown to process batches in a computing environment, in accordance with an exemplary implementation. The method begins when a user wishes to initiate the implementation of an autoscaling method to process long-running batches of an organization in a computing environment. The method 400 is implemented by at least one processor 104.

At step S402, the method includes receiving, by the at least one processor 104, a plurality of batches from a database. In an embodiment, each batch included in the plurality of batches may be transmitted with metadata and/or batch details and a corresponding schedule. The metadata associated with each batch may include batch information that may include, but is not limited to, jobs or tasks information, and processing information related to execution of the batch, such as resource requirements, dependencies, and retry policies. It is to be noted that the plurality of batches may be scheduled in the database. The database may be a cloud-based relational database service (e.g., Amazon Aurora®/Aurora® MySQL). The schedule of a batch may include schedule information such as, but not limited to, a start time, an anticipated end time, and a frequency. In an example, the schedule information may further include an expected batch processing time (start time and end time) and an expected batch processing duration.

The schedule of a batch may also refer to predetermined time slots or intervals at which a particular batch needs to be processed.

In an exemplary implementation, the at least one processor 104 may receive by a batch producer (also referred to as batch producer lambda), the plurality of batches from the database. It is to be noted that the batch producer lambda may read the batch details for each batch from a relational database service (RDS) table presented within the database, such as, Amazon Aurora®, and may pick up the plurality of batches that need to be executed. The batch details that are retrieved from the database may be pushed into a simple queue service (SQS) which stores messages. The messages herein may include the batch details of the plurality of batches which are sent to the SQS queue. In an exemplary implementation, batch details may include at least one from among a batch identity document (ID), a profile ID, a username, a name of batch, a status of the batch, a batch frequency, a scheduled date and time of batch, and a last run date and time of the batch.

At step S404, the method includes aggregating, by the at least one processor 104, the plurality of batches into a plurality of groups according to a predefined criterion.

The predefined criterion may include a criterion explaining the number of batches aggregated in a group. In an example, five batches are aggregated into one group. In an exemplary implementation, the at least one processor 104 using the batch producer reads the batch information from the database and picks up a plurality of batches that are to be executed. Further, the at least one processor 104 aggregates the plurality of batches into groups of five and pushes the groups or message details to a queue (e.g., Amazon simple queue service (SQS)).

At step S406, the method includes transmitting, by the at least one processor 104, the plurality of groups to the queue.

The queue may refer to a fully managed message queuing service provided by a cloud computing platform which allows developers to send, store, and receive groups or messages between software components at any volume, without losing messages. For example, three groups may be stored into the queue, and each group may include five batches.

At step S408, the method includes scaling, by the at least one processor 104, at least one resource to process each group from among the plurality of groups, wherein the scaling of the at least one resource is performed based on the metadata associated with each batch included in the plurality of batches.

In an exemplary implementation, the scaling of the at least one resource may include at least one from among an increase in a number of resources (e.g., virtual servers or instances) or a decrease in the number of resources.

In an example, the at least one processor 104 reads the metadata (e.g., size of batches or groups) associated with the plurality of batches and if required, increases the number of resources (e.g., virtual servers or instances such as elastic compute cloud (EC2) instances) to process the plurality of batches included in at least one group included in the plurality of groups. For example, the batch producer lambda organizes the plurality of batches into groups of 5, generates message details for each group, and pushes the message details to the SQS queue. Subsequently, the at least one processor 104 updates the desired capacity of a batch consumer auto scaling group (ASG) such that sufficient EC2 instances are available for processing. In an exemplary implementation, the batch consumer ASG spawns new EC2 instances for a batch consumer which picks up the newly published messages/batches for processing from the SQS queue and starts processing all batches in parallel.

At step S410, the method includes processing, by the at least one processor 104, the plurality of groups using the scaled at least one resource to execute the plurality of batches.

The method may further include assigning, by the at least one processor 104, a termination tag to an idle resource out of the scaled at least one resource. The scaled at least one resource may include virtual servers, cloud servers, and/or virtualized instances. In an example, the at least one processor 104 assigns a termination tag to a resource (e.g., an idle resource) that has completed the processing of at least one batch from the plurality of batches. The idle resource may refer to a resource which is in the idle state for a predetermined time interval after completing the batch processing. The predetermined time interval may be an interval of five minutes. For example, if at least one resource remains unutilized over an interval of five minutes, then the at least one resource is considered as the idle resource.

The method may further include terminating, by the at least one processor 104, an operation of the idle resource based on the assigned termination tag and a predetermined termination criterion (e.g., upon satisfying a predefined time interval such as five minutes). In an example, upon meeting the predetermined termination criterion, the at least one processor 104 uses the termination tag to shut down the scaled at least one resource.

In an implementation, the method may include transmitting, by the at least one processor 104, an alert to a user upon failure of an execution of at least one batch from the plurality of batches. For example, the batch consumer ASG runs a batch from the plurality of batches and sends a simple notification service (e.g., SNS) alert in case of failures. After the completion of the batch job, the batch consumer ASG assigns a termination-ready tag to the EC2 instance, indicating that it is no longer needed and can be safely terminated.

Figure 5:
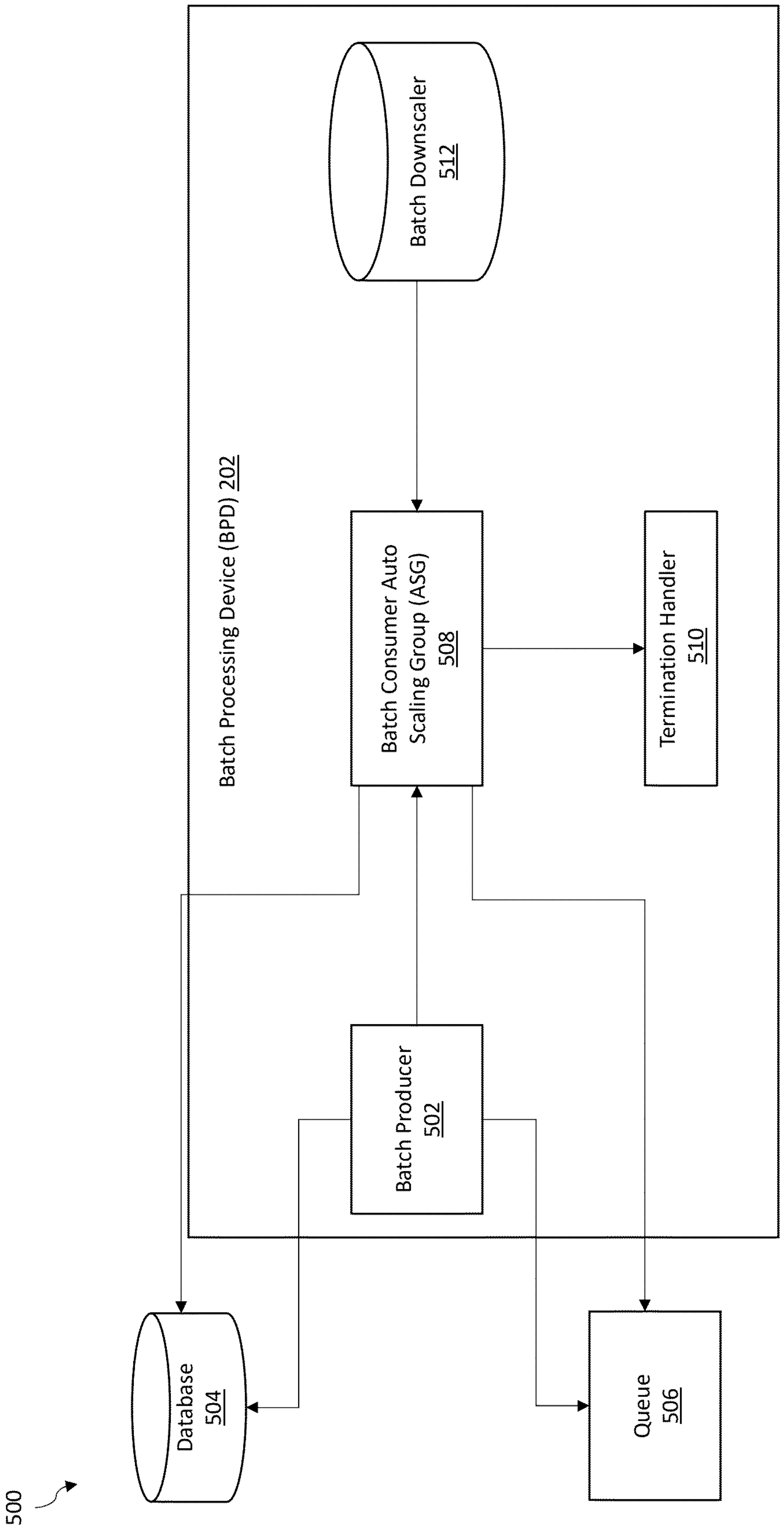
FIG. 5 illustrates a block diagram representing a system for processing batches in a computing environment, in accordance with an exemplary embodiment of the present disclosure.

FIG. 5 illustrates a block diagram that represents a system to process batches in a computing environment, in accordance with an exemplary embodiment. As illustrated in FIG. 5, the process flow 500 begins with receiving, by a batch producer 502 (also referred to as batch producer lambda), a plurality of batches from a database (e.g., Amazon Aurora®/Aurora® MySQL) 504. Each batch included in the plurality of batches may be received with metadata and a corresponding schedule. For example, at least one processor 104 triggers a periodic event bridge rule, which in turn invokes a step function. The step function orchestrates the execution of the batch producer lambda and a batch down-scaler lambda in a coordinated manner. The batch producer lambda reads the batch details for the plurality of batches from a relational database service (RDS) table presented within the Amazon Aurora®, selects the plurality of batches that are scheduled to be executed, and processes them accordingly.

Further, the batch producer 502 may aggregate the plurality of batches into a plurality of groups according to a predefined criterion and transmits the plurality of groups into a queue 506 (e.g., Amazon simple queue service (SQS)). For example, the batch producer lambda clubs batches into groups of 5 and pushes the message details to the SQS queue and updates the desired capacity of a batch consumer auto scaling group (ASG) 508. Further, the batch producer 502 increases the desired capacity of the batch consumer ASG 508 based on the metadata associated with each batch included in the plurality of batches stored in the plurality of groups. An increment in the desired capacity of the batch consumer ASG 508 is achieved by scaling at least one resource to process each group included in the plurality of groups available in the queue 506. It is to be noted that the batch consumer ASG 508 picks up newly published groups for processing from the queue 506. Further, the batch consumer ASG 508 processes the plurality of batches present within the plurality of groups using the scaled at least one resource (e.g., virtual servers or instances such as EC2).

In an exemplary implementation, the ASG spawns new EC2 instances for a batch consumer which picks up the newly published messages/batches for processing from the SQS queue and starts processing all batches in parallel. In an implementation, the batch consumer ASG 508 processes the plurality of batches in a parallel configuration. After processing the plurality of batches, the batch consumer ASG 508 assigns a termination tag to an idle resource out of the scaled at least one resource (e.g., an idle EC2 instance). The idle resource herein refers to one that completes the execution of the plurality of batches or is in an ideal state over a predetermined time interval (e.g., five minutes). The batch consumer ASG 508 runs a required batch job from the plurality of batches and sends a SNS (e.g., a simple notification service) alert in case of failures. After the completion of the batch job, the batch consumer ASG 508 may set a termination-ready tag on the EC2 instance.

Further, a termination handler 510 (e.g., ASG termination handler lambda) terminates an operation of the idle resource based on the termination tag and a predefined termination criterion. Furthermore, a batch downscaler 512 (e.g., the batch down-scaler lambda) reads the termination tag and reduces the processing capacity of the batch consumer ASG 508 by shutting down the idle resources. It is to be noted that the batch consumer ASG 508 uses a custom termination policy to select EC2 instances with termination-ready tag.

This way the system 500 processes batches in a computing environment (e.g., a cloud computing platform). Further, the batch consumer ASG 508 may transmit a notification to a user upon successful execution of the plurality of batches. In case of failure of the execution of at least one batch from the plurality of batches, the batch consumer ASG 508 may transmit an alert to the user to notify failure of the execution of the at least one batch.

It will be appreciated by the person skilled in the art that the system offers a full-circle, adaptable, and intelligent solution for implementing a method for processing batches in a computing environment.

Figure 6A:
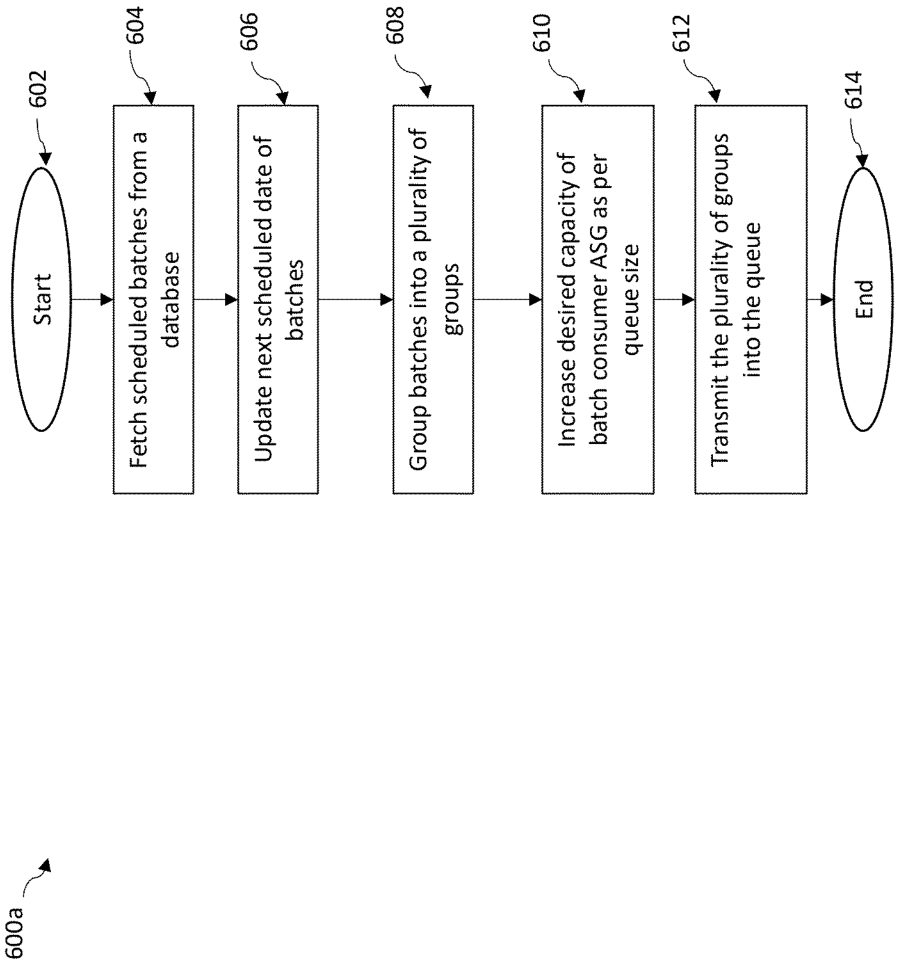
FIG. 6*a* illustrates an exemplary flow diagram depicting the functioning of a batch producer, in accordance with an exemplary embodiment of the present disclosure.

FIG. 6*a* illustrates an exemplary flow diagram depicting the functioning of a batch producer, in accordance with an exemplary embodiment of the present disclosure.

As illustrated in FIG. 6*a*, the process flow 600*a* begins at step 602. At step 604, the batch producer fetches scheduled batches (also referred to as a plurality of batches) from a database (e.g., a relational database such as Amazon Arora®). At step 606, the batch producer updates the next scheduled date of the batches. At step 608, the batch producer groups the batches into a plurality of groups (also referred to as messages). At step 610, the batch producer increases the desired capacity of a batch consumer auto scaling group (ASG)) based on the size of a queue (e.g., a simple queue service (SQS) size). The size of the queue refers to the maximum payload that can be sent in a single message or a group. At step 612, the batch producer transmits the plurality of groups into the queue. At last, the process ends at step 614.

In another exemplary implementation, at first, the process includes receiving, by a batch producer, a plurality of batches from a database. Each batch from the plurality of batches is received with a metadata and a corresponding schedule. The batch producer may update the schedule of each batch from the plurality of batches. Further, the process includes aggregating, by the batch producer, the plurality of batches into a plurality of groups as per a predefined criterion. The process further includes computing, by at least one processor 104, a current processing capacity for at least one resource (e.g., virtual servers) included in a batch consumer auto scaling group (ASG). If the current processing capacity of the at least one resource is greater than a required capacity for processing the plurality of groups to execute the plurality of batches, then the batch producer transmits the plurality of groups into a queue. When the current processing capacity of the at least one resource is less than a required capacity, the batch producer calculates the required number of resources to process the plurality of batches. Thereafter, the process includes scaling, by the batch producer, the at least one resource to process each group included in the plurality of groups, wherein scaling of the at least one resource is performed based on metadata associated with each batch from the plurality of batches. The scaling of the at least one resource includes at least one of an increase in a number of resources or a decrease in a number of resources. This way capacity of the batch consumer ASG is increased by adding a number of resources. Further, the process ends.

Figure 6B:
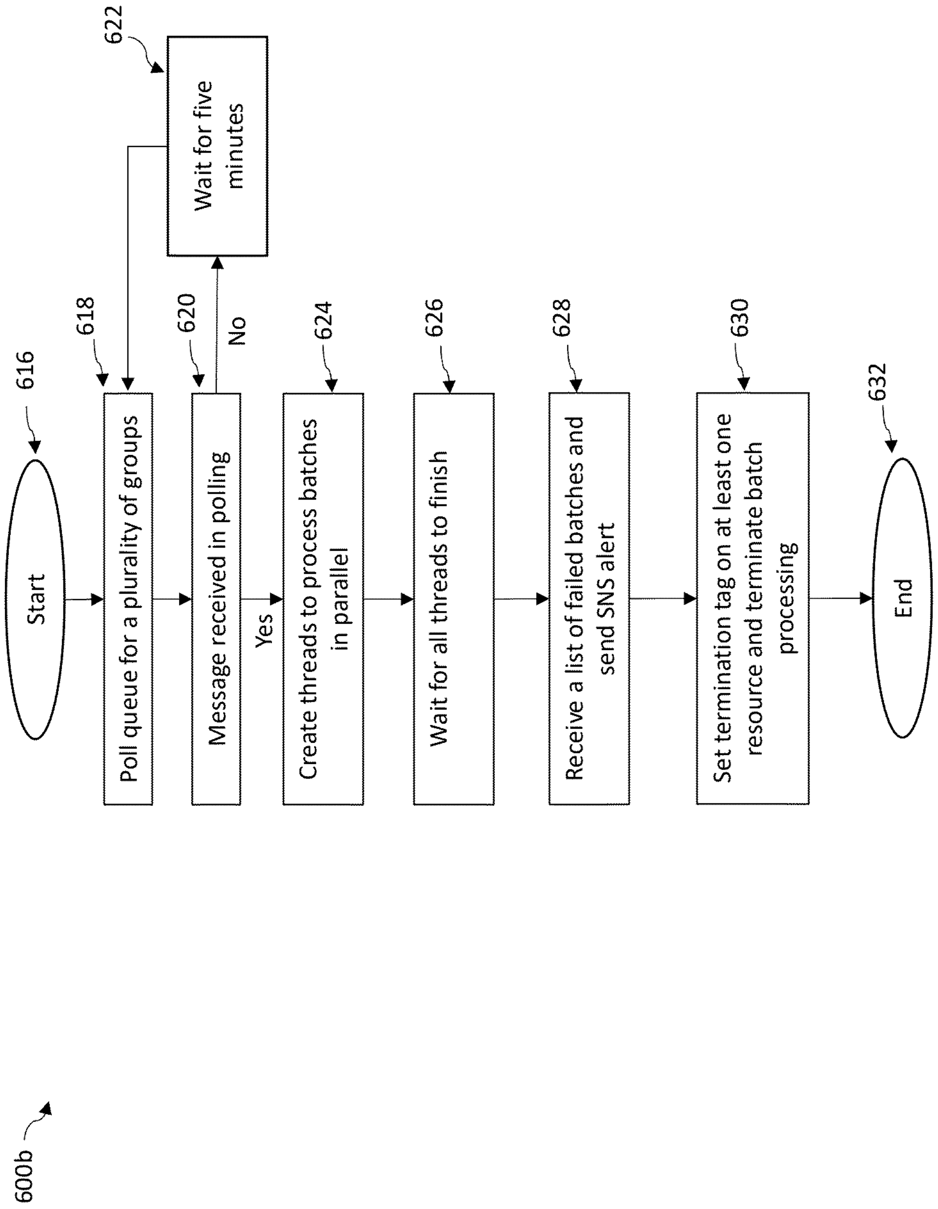
FIG. 6*b* illustrates an exemplary flow diagram depicting a method for processing batches and terminating resources, in accordance with an exemplary embodiment of the present disclosure.

FIG. 6*b* illustrates an exemplary flow diagram depicting a method for processing batches and terminating resources, in accordance with an exemplary embodiment of the present disclosure.

As illustrated in FIG. 6*b*, the process flow 600*b* begins at step 616. At step 618, a batch consumer auto scaling group (ASG) polls a queue to check for a plurality of groups. At step 620, the batch consumer ASG checks whether or not a group or a message was received during polling. If the message is received by the batch consumer ASG during polling then the process continues, else the batch consumer ASG resumes polling in the queue after a predetermined period at step 622. In an example, the batch consumer ASG resumes polling in the queue after five minutes. Further, the process flow 600*b* may include scaling, at least one resource to process a plurality of batches in each group received by polling, wherein the scaling of the at least one resource is performed based on metadata associated with each batch included in the group. The scaling of the at least one resource is performed based on a metadata associated with each batch included in the plurality of batches. In an exemplary implementation, the at least one resource may include virtual servers, or cloud servers or virtualized instances.

At step 624, the batch consumer ASG creates threads to process the plurality of batches in the received group in parallel. At step 626, the batch consumer ASG waits for all threads to finish processing the plurality of batches. At step 628, the batch consumer ASG receives a list of failed batches out of the plurality of batches and further the batch consumer ASG sends an alert (e.g., a simple notification service (SNS) alert). At step 630, the batch consumer ASG sets a termination tag on an idle resource out of the scaled at least one resource (e.g., virtual servers on a computing platform) and terminates an operation of the idle resource based on the termination-ready tag and a predetermined termination criterion. It is to be noted that the batch consumer ASG uses a custom termination policy to select the instances for termination using the termination-ready tag on the at least one resource. Thereafter, the process ends at step 632.

In another exemplary implementation, the process includes computing, by at least one processor 104, the current processing capacity for at least one resource (e.g., virtual servers or instances). If the current processing capacity of the at least one resource is greater than a required capacity for processing the plurality of groups to execute the plurality of batches, then batch consumer ASG traverses the queue for retrieving at least one other group out of the plurality of groups.

When the batch consumer ASG fails to retrieve at least one other group from the queue, the process further includes assigning a termination tag to an idle resource out of the scaled at least one resource (e.g., a resource which is in ideal state for a predefined period or a resource which successfully executed the plurality of batches The method further includes terminating, by the at least one processor 104 an operation of the scaled at least one resource based on the termination tag and a predefined termination criterion.

The present disclosure provides several advantages as given below. The present disclosure introduces a cost-effective and scalable solution for processing batch jobs in a cloud computing environment by leveraging auto-scaling capabilities. The present disclosure ensures that EC2 instances are only running when required, significantly reducing operational costs. The present disclosure implements an efficient scaling mechanism where resources dynamically scale in and out based on the batch processing demand, thereby optimizing resource utilization. The present disclosure employs a decoupled architecture with SQS queues such that the batch producer and consumer workflows operate independently, enhancing system reliability and fault isolation. Each batch job runs on a separate EC2 instance such that the failures do not impact other batch executions, thereby increasing fault tolerance. Additionally, the present disclosure incorporates automated failure alerting to enable prompt notifications to production support and site reliability engineering (SRE) teams for quick remediation. In this way, immediate processing of batch jobs is achieved, eliminating waiting times and improving overall efficiency. Furthermore, the use of a custom termination policy and tagging mechanism enables optimal resource management by terminating idle EC2 instances efficiently.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor 104 or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or other storage device to capture carrier wave signals such as a signal communicated via a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions to process batches in a computing environment is disclosed. The instructions include executable code which, when executed by a processor 104, may cause the processor 104 to receive a plurality of batches from a database; aggregate the plurality of batches into a plurality of groups as per a predefined criterion; transmit the plurality of groups into a queue; scale at least one resource to process each group from among the plurality of groups, wherein scaling of the at least one resource is performed based on a metadata associated with each batch from among the plurality of batches; and process the plurality of groups using at least one resource to execute the plurality of batches.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

We claim:

1. A method for processing batches in a computing environment, the method being implemented by at least one processor, the method comprising:

receiving, by the at least one processor, a plurality of batches from a database;

aggregating, by the at least one processor, the plurality of batches into a plurality of groups according to a predefined criterion;

transmitting, by the at least one processor, the plurality of groups to a queue;

scaling, by the at least one processor, at least one resource to process each group included in the plurality of groups, wherein the scaling of the at least one resource is performed based on metadata associated with each batch included in the plurality of batches; and processing, by the at least one processor, the plurality of groups using the scaled at least one resource to execute the plurality of batches, wherein the at least one resource includes an elastic compute cloud instance, and wherein the scaling comprises using a batch consumer auto scaling group that is configured to automatically spawn new elastic compute cloud instances that are configured to perform the executing of the plurality of batches in parallel.

2. The method as claimed in claim 1, wherein each group included in the plurality of groups is transmitted with the metadata and a corresponding schedule.

3. The method as claimed in claim 1, wherein the scaling of the at least one resource comprises at least one from among an increase in a number of resources and a decrease in the number of resources.

4. The method as claimed in claim 1, further comprising assigning, by the at least one processor, a termination tag to an idle resource out of the scaled at least one resource, wherein the idle resource is determined as being idle based on being in an idle state for five minutes after completing the processing of the plurality of groups.

5. The method as claimed in claim 4, further comprising terminating, by the at least one processor, an operation of the idle resource based on the assigned termination tag and a predetermined termination criterion.

6. The method as claimed in claim 1, further comprising transmitting, by the at least one processor, an alert to a user upon failure of execution of at least one batch included in the plurality of batches.

7. A computing device configured to process batches in a computing environment, the computing device comprising:

a processor;

a memory storing instructions; and a communication interface coupled to each of the processor and the memory, wherein the processor is programmed to cooperate with the instructions to perform operations comprising:

receiving a plurality of batches from a database;

aggregating the plurality of batches into a plurality of groups according to a predefined criterion;

transmitting the plurality of groups to a queue;

scaling at least one resource to process each group included in the plurality of groups, wherein the scaling of the at least one resource is performed based on metadata associated with each batch included in the plurality of batches; and processing the plurality of groups using the scaled at least one resource to execute the plurality of batches, wherein the at least one resource includes an elastic compute cloud instance, and wherein the scaling comprises using a batch consumer auto scaling group that is configured to automatically spawn new elastic compute cloud instances that are configured to perform the executing of the plurality of batches in parallel.

8. The computing device as claimed in claim 7, wherein each group included in the plurality of groups is transmitted with the metadata and a corresponding schedule.

9. The computing device as claimed in claim 7, wherein the scaling of the at least one resource comprises at least one from among an increase in a number of resources and a decrease in the number of resources.

10. The computing device as claimed in claim 7, wherein the processor is configured to assign a termination tag to an idle resource out of the scaled at least one resource, wherein the idle resource is determined as being idle based on being in an idle state for five minutes after completing the processing of the plurality of groups.

11. The computing device as claimed in claim 10, wherein the processor is further configured to terminate an operation of the idle resource based on the assigned termination tag and a predetermined termination criterion.

12. The computing device as claimed in claim 7, wherein the processor is configured to transmit an alert to a user upon failure of execution of at least one batch included in the plurality of batches.

13. A non-transitory computer readable storage medium storing instructions for processing batches in a computing environment, the instructions comprising executable code which when executed by a processor, causes the processor to perform operations comprising:

receiving a plurality of batches from a database;

aggregating the plurality of batches into a plurality of groups according to a predefined criterion;

transmitting the plurality of groups to a queue;

scaling at least one resource to process each group included in the plurality of groups, wherein the scaling of the at least one resource is performed based on metadata associated with each batch included in the plurality of batches; and processing the plurality of groups using the scaled at least one resource to execute the plurality of batches, wherein the at least one resource includes an elastic compute cloud instance, and wherein the scaling comprises using a batch consumer auto scaling group that is configured to automatically spawn new elastic compute cloud instances that are configured to perform the executing of the plurality of batches in parallel.

14. The non-transitory storage medium as claimed in claim 13, wherein each group included in the plurality of groups is transmitted with the metadata and a corresponding schedule.

15. The non-transitory storage medium as claimed in claim 13, wherein the scaling of the at least one resource comprises at least one from among an increase in a number of resources and a decrease in the number of resources.

16. The non-transitory storage medium as claimed in claim 13, wherein the operations further comprise assigning a termination tag to an idle resource out of the scaled at least one resource, wherein the idle resource is determined as being idle based on being in an idle state for five minutes after completing the processing of the plurality of groups.

17. The non-transitory storage medium as claimed in claim 16, wherein the operations further comprise terminating an operation of the idle resource based on the assigned termination tag and a predetermined termination criterion.

18. The non-transitory storage medium as claimed in claim 13, wherein the operations further comprise transmitting an alert to a user upon failure of execution of at least one batch included in the plurality of batches.

* * * * *